(12) United States Patent
Iwamura et al.

(10) Patent No.: US 9,521,639 B2
(45) Date of Patent: Dec. 13, 2016

(54) MOBILE COMMUNICATION SYSTEM

(75) Inventors: Mikio Iwamura, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 343 days.

(21) Appl. No.: 14/118,350

(22) PCT Filed: May 11, 2012

(86) PCT No.: PCT/JP2012/062112
§ 371 (c)(1),
(2), (4) Date: Nov. 18, 2013

(87) PCT Pub. No.: WO2012/157550
PCT Pub. Date: Nov. 22, 2012

(65) Prior Publication Data
US 2014/0098784 A1  Apr. 10, 2014

(30) Foreign Application Priority Data
May 19, 2011 (JP) ................. 2011-112653

(51) Int. Cl.
*H04W 4/00* (2009.01)
*H04W 56/00* (2009.01)
(Continued)

(52) U.S. Cl.
CPC ....... *H04W 56/0045* (2013.01); *H04B 7/2656* (2013.01); *H04L 5/0007* (2013.01);
(Continued)

(58) Field of Classification Search
CPC ........... H04W 56/0045; H04W 56/003; H04W 72/0453; H04B 7/2656; H04L 5/0007; H04L 5/0044; H04L 5/0062
(Continued)

(56) References Cited

U.S. PATENT DOCUMENTS

| | | | | |
|---|---|---|---|---|
| 2004/0048609 A1* | 3/2004 | Kosaka | ............... | H04W 56/002 455/422.1 |
| 2009/0219875 A1* | 9/2009 | Kwak | ................ | H04B 7/2615 370/329 |
| 2011/0170431 A1* | 7/2011 | Palanki | ............... | H04W 52/245 370/252 |

FOREIGN PATENT DOCUMENTS

| | | |
|---|---|---|
| JP | 2003-61152 A | 2/2003 |
| JP | 2009-164863 A | 7/2009 |

(Continued)

OTHER PUBLICATIONS

International Search Report for corresponding International Application No. PCT/JP2012/062112, mailed Jun. 19, 2012 (4 pages).

(Continued)

*Primary Examiner* — Peter Cheng
(74) *Attorney, Agent, or Firm* — Osha Liang LLP

(57) ABSTRACT

Orthogonality between signals is maintained in direct communication between a mobile station UE#1 and a mobile station UE#2. In a mobile communication system according to the present invention, a radio base station eNB is configured to transmit a data signal to the UE#1 and the UE#2 through a Uu interface at a frequency f1, the UE#1 and the UE#2 are configured to transmit the data signal to the radio base station eNB through the Uu interface at a frequency F2, the UE#1 and the UE#2 are configured to transmit and receive the data signal to and from each other in a time-division manner through a Ud interface at the frequency F2, and predetermined gaps are configured to be provided before and after timing in which the UE#1 and the UE#2 transmit the data signal through the Ud interface.

9 Claims, 6 Drawing Sheets

(51) Int. Cl.
H04W 72/04 (2009.01)
H04L 5/00 (2006.01)
H04B 7/26 (2006.01)

(52) U.S. Cl.
CPC .......... *H04L 5/0044* (2013.01); *H04L 5/0062* (2013.01); *H04W 56/003* (2013.01); *H04W 72/0453* (2013.01)

(58) Field of Classification Search
USPC ....................................................... 370/330
See application file for complete search history.

(56) References Cited

FOREIGN PATENT DOCUMENTS

| | | |
|---|---|---|
| JP | 2010-532967 A | 10/2010 |
| JP | 2010-283725 A | 12/2010 |
| JP | 2011-55221 A | 3/2011 |
| WO | 02/49387 A1 | 6/2002 |
| WO | 2009/009309 A1 | 1/2009 |

OTHER PUBLICATIONS

Office Action for corresponding Japanese Application No. 2011-112653, mailed Apr. 23, 2013 (7 pages).
3GPP TS 36.323 V10.1.0; "3rd Generation Partnership Project; Technical Specification Group Radio Access Network; Evolved Universal Terrestrial Radio Access (E-UTRA); Packet Data Convergence Protocol (PDCP) specification (Release 10);" Mar. 2011 (26 pages).

* cited by examiner

MOBILE COMMUNICATION SYSTEM

TECHNICAL FIELD

The present invention relates to a mobile communication system.

BACKGROUND ART

FIG. 6 illustrates state of TA (Timing Advance) control in a conventional LTE (Long Term Evolution) system.

As illustrated in FIG. 6, in the TA control, a radio base station eNB is configured to transmit a "TA command (TA1 and TA2)" to a mobile station UE#1 and a mobile station UE#2 to align reception timing ("Uu UL") of an uplink signal such that the uplink signals transmitted from the mobile station UE#1 and the mobile station UE#2 are orthogonal to each other.

The mobile station UE#1 and the mobile station UE#2 are configured to adjust the transmission timing ("Uu UL") of the uplink signal based on the "TA command (TA1 and TA2)" received from the radio base station eNB.

Thus, a propagation delay of the uplink signal can be corrected by applying the TA control.

CITATION LIST

Non-Patent Literature

Non-Patent Literature 1: 3GPP TS36.323

SUMMARY OF INVENTION

At this point, in a conventional LTE mobile communication system, even if the multiple mobile stations UE are located in an identical cell (or a cell under control of the radio base station eNB), because both a data signal and a control signal are configured to be transmitted and received through the radio base station eNB, unfortunately a processing load on the radio base station eNB increases.

In order to solve the problem, it is conceivable that the multiple mobile stations UE transmit and receive the data signal through not a radio link in a Uu interface set between the mobile stations UE and the radio base station eNB, but a radio link in an inter-mobile station interface (hereinafter referred to as a Ud interface).

In the case that direct communication (that is, Ud communication or D2D communication) between the mobile station UE#1 and the mobile station UE#2 is considered, a distance between the mobile station UE#1 and the mobile station UE#2 becomes troublesome in adjusting the transmission timing through the Ud interface.

For example, as illustrated in FIG. 7(a), even if the distance (propagation delay T1) between the mobile station UE#1 and the radio base station eNB and the distance (propagation delay T2) between the mobile station UE#2 and the radio base station eNB does not change, the distance (propagation delay TX) between the mobile station UE#1 and the mobile station UE#2 changes when the mobile station UE#1 or the mobile station UE#2 moves on an arc.

Actually loci of the mobile station UE#1 and the mobile station UE#2 are complicated, and it is considered that the distance (propagation delay TX) between the mobile station UE#1 and the mobile station UE#2 also changes as the distance (propagation delay T1) between the mobile station UE#1 and the radio base station eNB and the distance (propagation delay T2) between the mobile station UE#2 and the radio base station eNB change as illustrated in FIG. 7(b).

The present invention has been devised to solve the above problems, and an object thereof is to provide a mobile communication system that can maintain the orthogonality between the signals in the direct communication between the mobile station UE#1 and the mobile station UE#2.

In accordance with a first aspect of the present invention, a mobile communication system in which a radio base station interface between a first mobile station and a second mobile station and a radio base station and an inter-mobile station interface between the first mobile station and the second mobile station are specified. In the mobile communication system, the radio base station is configured to transmit a data signal to the first mobile station and the second mobile station through the radio base station interface at a first frequency, the first mobile station and the second mobile station are configured to transmit the data signal to the radio base station through the radio base station interface at a second frequency, the first mobile station and the second mobile station are configured to transmit and receive the data signal to and from each other in a time-division manner through the inter-mobile station interface at the second frequency, and predetermined gaps are configured to be provided before and after timing in which the first mobile station and the second mobile station transmit the data signal through the inter-mobile station interface.

In accordance with a second aspect of the present invention, a mobile communication system in which a radio base station interface between a first mobile station and a second mobile station and a radio base station and an inter-mobile station interface between the first mobile station and the second mobile station are specified. In the mobile communication system, the radio base station is configured to transmit a data signal to the first mobile station and the second mobile station through the radio base station interface at a first frequency, the first mobile station and the second mobile station are configured to transmit and receive the data signal to and from each other in a time-division manner through the inter-mobile station interface at the first frequency, the first mobile station and the second mobile station are configured to transmit the data signal to the radio base station through the radio base station interface at a second frequency, and predetermined gaps are configured to be provided before and after timing in which the first mobile station and the second mobile station transmit the data signal through the inter-mobile station interface.

In accordance with a third aspect of the present invention, a mobile communication system in which a radio base station interface between a first mobile station and a second mobile station and a radio base station and an inter-mobile station interface between the first mobile station and the second mobile station are specified. In the mobile communication system, the radio base station is configured to transmit a data signal to the first mobile station and the second mobile station through the radio base station interface at a first frequency, the first mobile station and the second mobile station are configured to transmit the data signal to the radio base station through the radio base station interface at a second frequency, the first mobile station and the second mobile station are configured to transmit and receive the data signal to and from each other in a time-division manner through the inter-mobile station interface at a third frequency, and predetermined gaps are configured to be provided before and after timing in which the first mobile station and the second mobile station transmit the data signal through the inter-mobile station interface.

DESCRIPTION OF EMBODIMENT (Mobile Communication System According to Embodiment of the Present Invention)

A mobile communication system according to an embodiment of the present invention will be described with reference to FIGS. 1 to 5.

Figure 1:
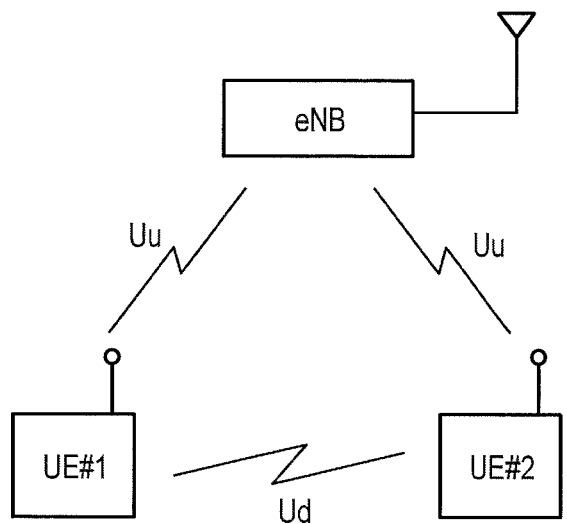
FIG. 1 is an entire configuration diagram of a mobile communication system according to an embodiment of the present invention.

The mobile communication system of the embodiment is an LTE mobile communication system, and includes a core network and a radio base station eNB connected to a core network device as illustrated in FIG. 1. The present invention can also be applied to a cellular mobile communication system in addition to the LTE mobile communication system.

In the mobile communication system of the embodiment, a Uu interface between a mobile station UE#1 and a mobile station UE#2 and a radio base station eNB and a Ud interface between the mobile station UE#1 and the mobile station UE#2 are specified.

The mobile station UE#1 is configured to be able to transmit and receive a data signal to and from the mobile station UE#2 through not the Uu interface but the Ud interface.

The mobile station UE#1 is configured to be able to transmit and receive the data signal and a control signal to and from the radio base station eNB through the Uu interface.

Similarly, the mobile station UE#2 is configured to be able to transmit and receive the data signal to and from the mobile station UE#1 through not the Uu interface but the Ud interface.

The mobile station UE#2 is configured to be able to transmit and receive the data signal and the control signal to and from the radio base station eNB through the Uu interface.

Figure 2:
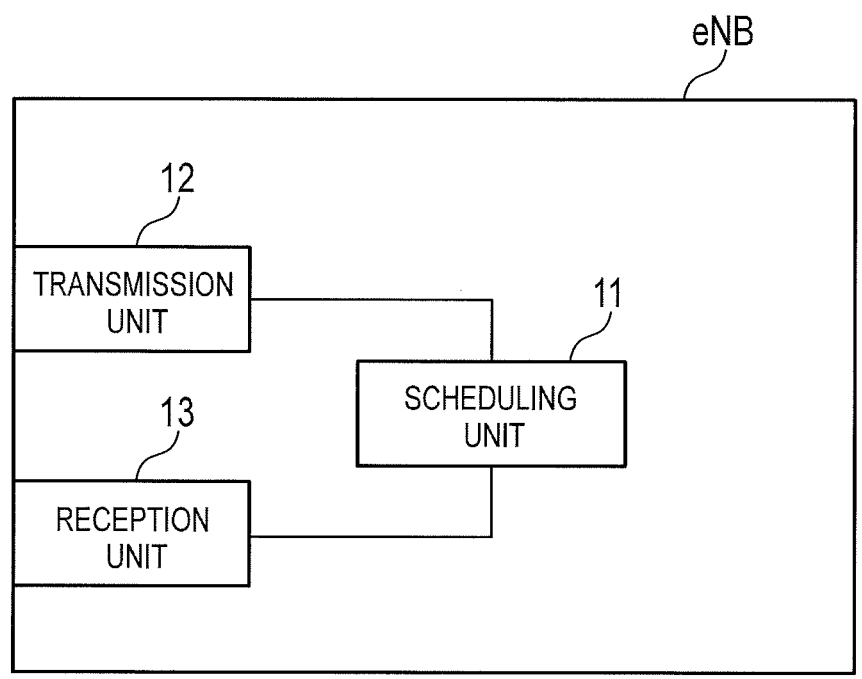
FIG. 2 is a functional block diagram of a radio base station according to the embodiment of the present invention.

As illustrated in FIG. 2, the radio base station eNB includes a scheduling unit 11, a transmission unit 12, and a reception unit 13.

The scheduling unit 11 is configured to allocate transmission opportunities "Uu UL" and "Uu DL" through the Uu interface (PUSCH/PDSCH) or transmission opportunities "Ud Tx" and "Ud Rx" through the Ud interface to the mobile station UE#1 and the mobile station UE#2.

Using a PDCCH through the Uu interface, the transmission unit 12 is configured to notify the mobile station UE#1 and the mobile station UE#2 of a transmission opportunity through the Uu interface or a transmission opportunity through the Ud interface.

Using the PDCCH through the Uu interface, the transmission unit 12 is configured to transmit the data signal (transport block) to the mobile station UE#1 and the mobile station UE#2.

Using the PUSCH through the Uu interface, the reception unit 13 is configured to receive the data signal (transport block) from the mobile station UE#1 and the mobile station UE#2 through the Uu interface.

In the mobile communication system of the embodiment, the following three cases are considered by a combination of a frequency used in the transmission/reception through the Uu interface and a frequency used in the transmission/reception through the Ud interface.

<Case 1>

First, a case 1 in which the frequency used in the transmission/reception through the Ud interface is equal to the frequency used in the transmission/reception of an uplink through the Uu interface will be described with reference to FIG. 3.

Figure 3:
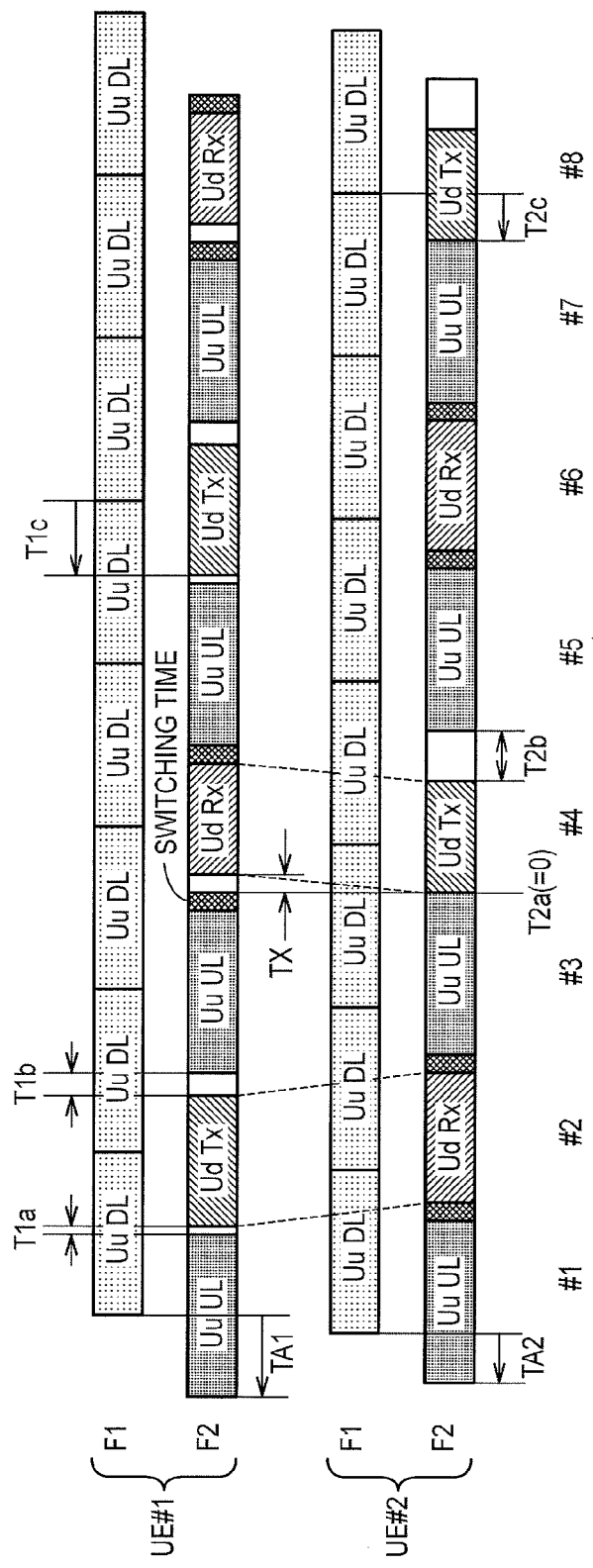
FIG. 3 is a view illustrating transmission/reception timing in the mobile communication system according to the embodiment of the present invention.

As illustrated in FIG. 3, in the case 1, the transmission/reception through the Ud interface and the transmission/reception of the uplink through the Uu interface are configured to be performed in a time-division manner at a frequency F2.

As illustrated in FIG. 3, in the case 1, the transmission/reception of a downlink through the Uu interface is configured to be performed at a frequency F1.

In the case 1, at the frequency F2, it is necessary for the mobile station UE#1 and the mobile station UE#2 to switch an internal circuit between the case that the transmission is performed through the Uu and Ud interfaces and the case that the reception is performed through the Ud interface. Therefore, a time is required to switch the internal circuit.

Accordingly, it is necessary for the mobile station UE#1 and the mobile station UE#2 to perform the reception through the Ud interface within a time except the switching time in each subframe.

That is, in consideration of a propagation delay TX between the mobile station UE#1 and the mobile station UE#2, it is necessary for the mobile station UE#1 (or mobile station UE#2) to transmit the data signal through the Ud interface such that the data signal reaches the mobile station UE#2 (or mobile station UE#1) within a reception window "Ud Rx" of the mobile station UE#2 (or mobile station UE#1).

Accordingly, for example, in the case that the mobile station UE#1 transmits the data signal to the mobile station UE#2 as illustrated in FIG. 3, in a subframe #2 in which the mobile station UE#1 transmits the data signal to the mobile station UE#2 through the Ud interface at the frequency F2, predetermined gaps T1a and T1b are configured to be provided before and after timing "Ud Tx" in which the data signal is transmitted in consideration of the switching time and a time necessary to maintain signal orthogonality.

Similarly, in the case that the mobile station UE#2 transmits the data signal to the mobile station UE#1, in a subframe #4 in which the mobile station UE#2 transmits the data signal to the mobile station UE#1 through the Ud interface at the frequency F2, predetermined gaps T2a and T2b are configured to be provided before and after the timing "Ud Tx" in which the data signal is transmitted in consideration of the switching time and the time necessary to maintain the signal orthogonality.

That is, in the subframe #2 in which the mobile station UE#1 transmits the data signal to the mobile station UE#2 through the Ud interface at the frequency F2 or the subframe #4 in which the mobile station UE#2 transmits the data signal to the mobile station UE#1 through the Ud interface at the frequency F2, the time in which the data signal is transmitted is configured to be shorter than duration of a usual subframe.

For example, in the subframes #2 and #4, the time in which the data signal is transmitted is configured to be shorter than the duration of the usual subframe by decreasing the number of OFDM symbols.

When the usual subframe has 14 OFDM symbols, the subframes #2 and #4 may be configured to decrease the number of OFDM symbols to "13" or "12".

The one or multiple predetermined gaps may be "0" like T2a in FIG. 3.

At this point, the duration of the predetermined gap or the duration of the subframe except the predetermined gap may be specified in units of symbols.

The radio base station eNB may notify the mobile station UE#1 and the mobile station UE#2 of the duration (for example, the number of symbols) of the predetermined gap. For example, the mobile station UE#1 and the mobile station UE#2 may be notified of the duration of the predetermined gap through RRC signaling.

The reception window "Ud Rx" changes depending on propagation delays T1 and T2 (or sizes of TA1 and TA2). Accordingly, in the Ud interface, transmission timing "Ud Tx" depends on T1, T2, and TX.

While TA1 and TA2 are known in the radio base station eNB, TX is unclear in the radio base station eNB. As described above, sometimes TX changes although TA1 or TA2 are invariable.

In the case 1, the time the signal transmitted through the Ud interface by the mobile station UE reaches the radio base station eNB (as interference) is matched with the timing "Uu UL", so that the orthogonality can be maintained at the frequency F1.

<Case 2>

Second, a case 2 in which the frequency used in the transmission/reception through the Ud interface is equal to the frequency used in the transmission/reception of the downlink through the Uu interface will be described with reference to FIG. 4.

Figure 4:
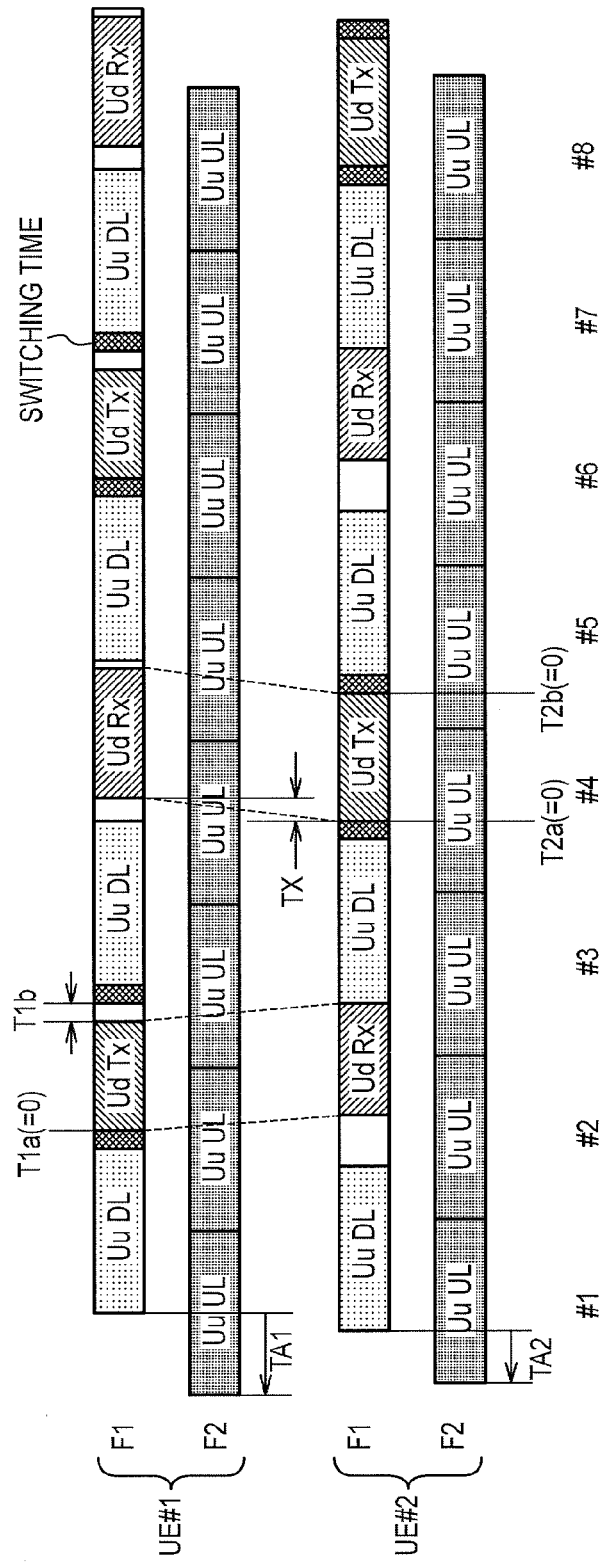
FIG. 4 is a view illustrating the transmission/reception timing in the mobile communication system according to the embodiment of the present invention.

As illustrated in FIG. 4, in the case 2, the transmission/reception through the Ud interface and the transmission/reception of the downlink through the Uu interface are configured to be performed in the time-division manner at the frequency F1.

As illustrated in FIG. 4, in the case 2, the transmission/reception of the uplink through the Uu interface is configured to be performed at the frequency F2.

In the case 2, at the frequency F1, it is necessary for the mobile station UE#1 and the mobile station UE#2 to switch the internal circuit between the case that the transmission is performed through the Ud interface and the case that the reception is performed through the Uu and Ud interfaces. Therefore, the time is required to switch the internal circuit.

Accordingly, for example, in the case that the mobile station UE#1 transmits the data signal to the mobile station UE#2 as illustrated in FIG. 4, in the subframe #2 in which the mobile station UE#1 transmits the data signal to the mobile station UE#2 through the Ud interface at the frequency F1, the predetermined gaps T1a and T1b are configured to be provided before and after the timing "Ud Tx" in which the data signal is transmitted.

Similarly, in the case that the mobile station UE#2 transmits the data signal to the mobile station UE#1, in the subframe #4 in which the mobile station UE#2 transmits the data signal to the mobile station UE#1 through the Ud interface at the frequency F2, the predetermined gaps T2a and T2b are configured to be provided before and after the timing "Ud Tx" in which the data signal is transmitted.

The one or multiple predetermined gaps may be "0" like T1a, T2a, and T2b in FIG. 4.

Accordingly, in the case 2, similarly to the case 1, in consideration of the reception window "Ud Rx" of the mobile station UE#2 (or mobile station UE#1), it is necessary for the mobile station UE#1 (or mobile station UE#2) to transmit the data signal through the Ud interface, and the transmission timing "Ud Tx" depends on T1, T2, and TX in the Ud interface.

In the case 1, the timing in which the signal transmitted through the Ud interface by the mobile station UE reaches another mobile station UE near the mobile station UE (as the interference) depends on a distance between the mobile station UE that performs the transmission through the Ud interface and another mobile station UE near the mobile station UE.

Accordingly, in consideration of these propagation delays, it is necessary to sufficiently provide the predetermined gap. Therefore, the orthogonality is maintained such that the signal transmitted through the Ud interface by the mobile station UE does not interfere with the reception window "Uu DL" in the Uu interface of another mobile station UE near the mobile station UE.

<Case 3>

Third, a case 3 in which the frequency used in the transmission/reception through the Ud interface is different from the frequency used in the transmission/reception through the Uu interface will be described with reference to FIG. 5.

Figure 5:
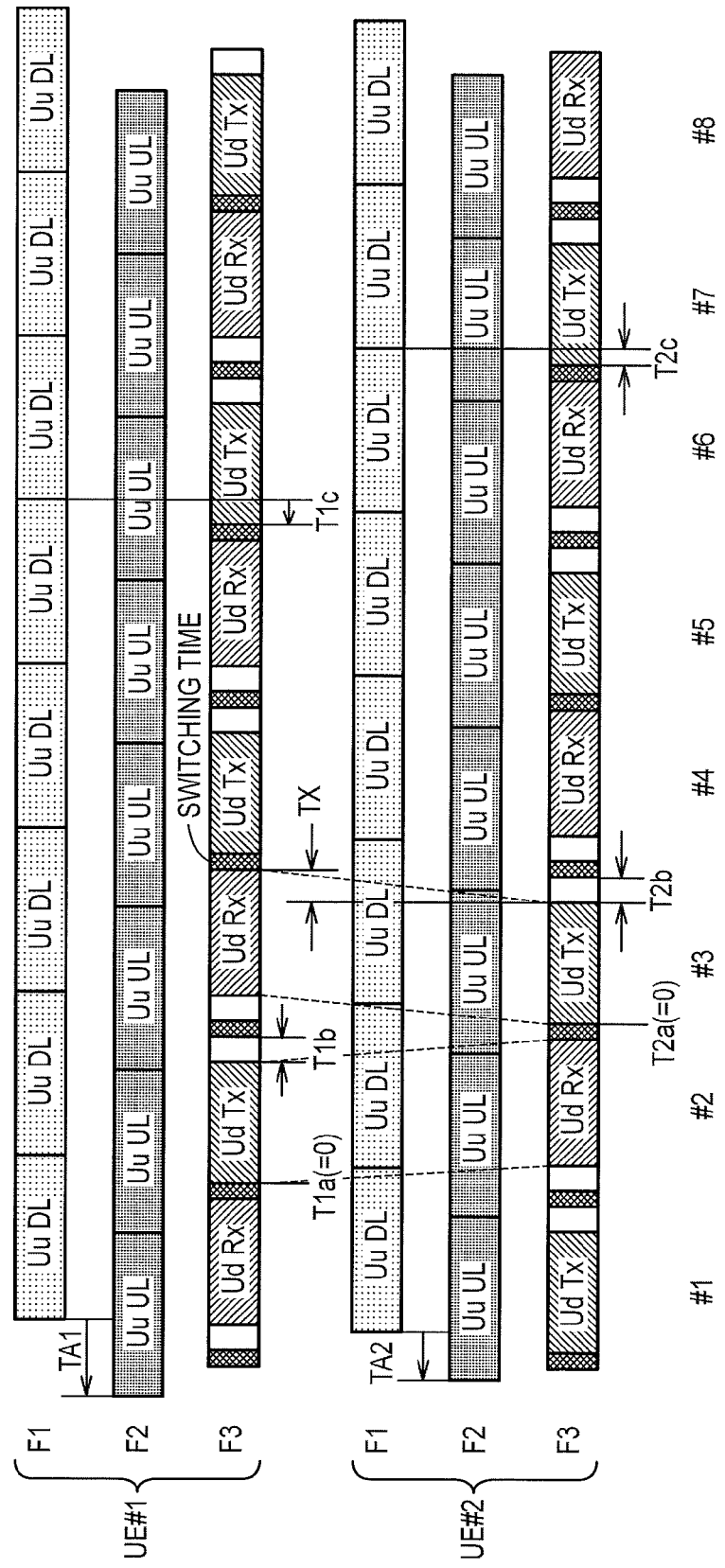
FIG. 5 is a view illustrating the transmission/reception timing in the mobile communication system according to the embodiment of the present invention.
Figure 6:
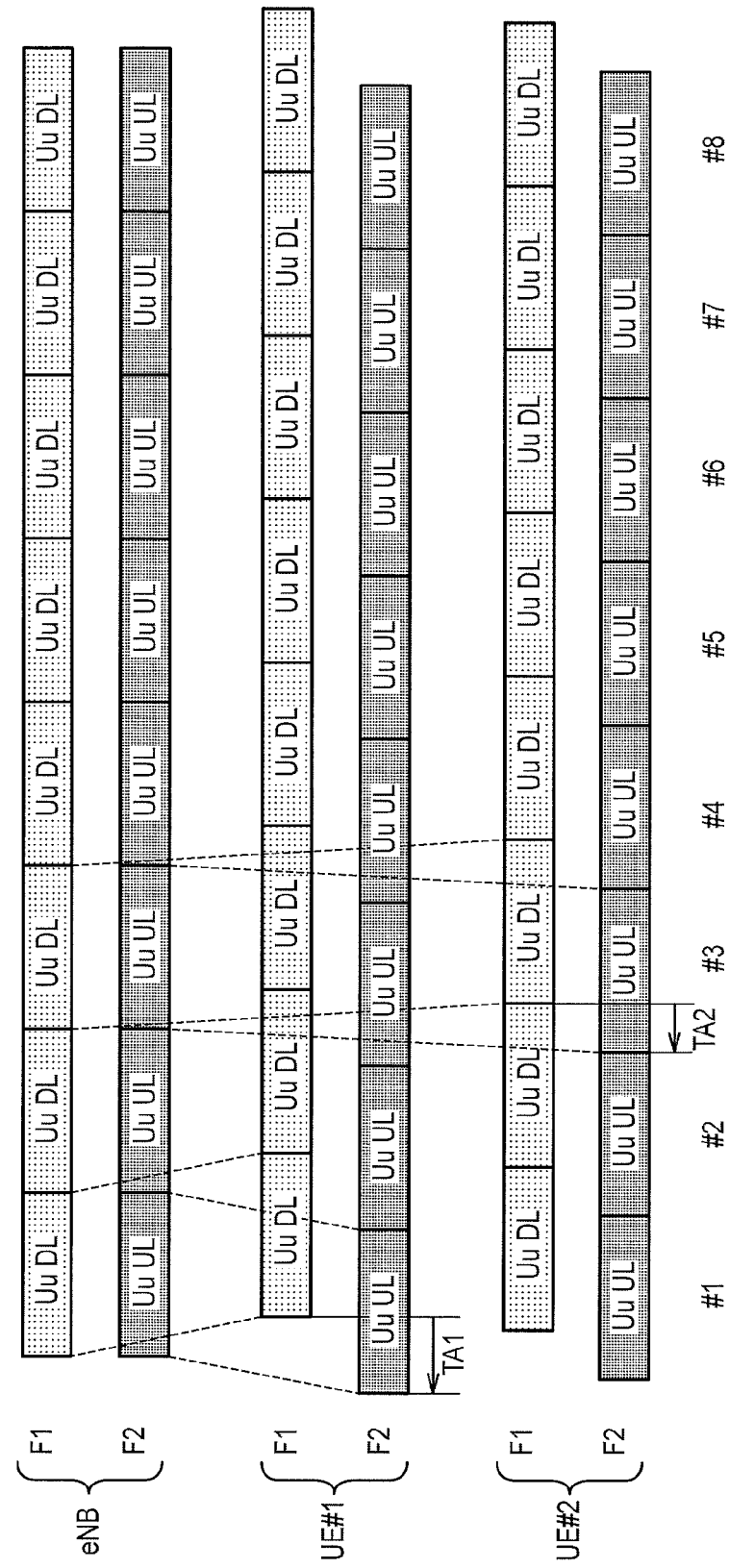
FIG. 6 is a view explaining a conventional mobile communication system.
Figure 7:
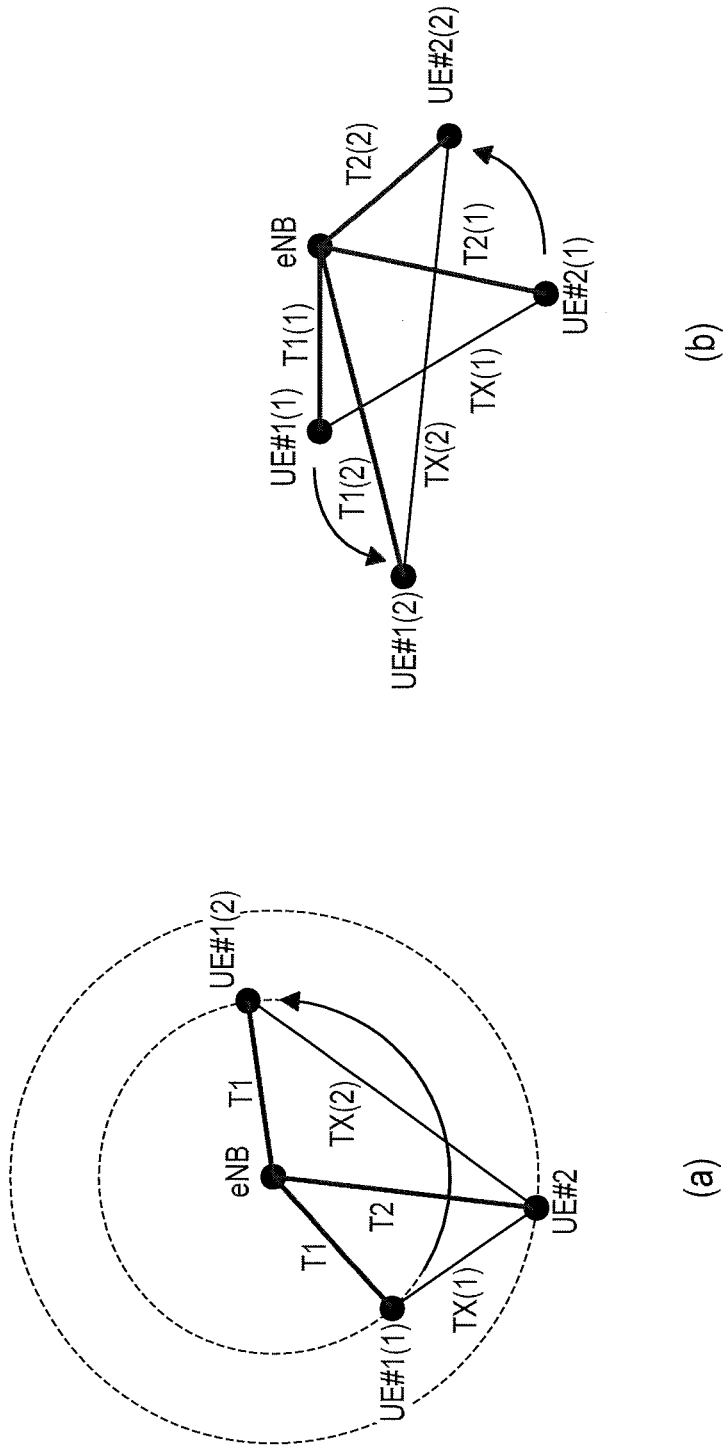
FIGS. 7(a) and 7(b) are views explaining the conventional mobile communication system.

As illustrated in FIG. 5, in the case 3, the transmission/reception of the downlink through the Uu interface is performed at the frequency F1, the transmission/reception of the uplink through the Uu interface is performed at the frequency F2, and the transmission/reception through the Ud interface is performed at a frequency F3.

The transmission/reception through the Ud interface (UE#1→UE#2) and the transmission/reception through the Ud interface (UE#2→UE#1) are configured to be performed in the time-division manner at the frequency F3.

In the case 3, at the frequency F3, it is necessary for the mobile station UE#1 and the mobile station UE#2 to switch the internal circuit between the case that the transmission is performed through the Ud interface and the case that the reception is performed through the Ud interfaces. Therefore, the time is required to switch the internal circuit.

Accordingly, in consideration of the switching time, it is necessary for the mobile station UE#1 (or mobile station UE#2) to determine the transmission timing "Ud Tx" of the data signal through the Ud interface such that the data signal transmitted through the Ud interface falls within the reception window "Ud Rx" in the mobile station UE#2 (or mobile station UE#1).

Accordingly, for example, in the case that the mobile station UE#1 transmits the data signal to the mobile station UE#2 as illustrated in FIG. 5, in the subframe #2 in which the mobile station UE#1 transmits the data signal to the mobile station UE#2 through the Ud interface at the frequency F3, the predetermined gaps T1a and T1b are configured to be provided before and after the timing "Ud Tx" in which the data signal is transmitted.

Similarly, in the case that the mobile station UE#2 transmits the data signal to the mobile station UE#1, in the subframe #4 in which the mobile station UE#2 transmits the data signal to the mobile station UE#1 through the Ud interface at the frequency F3, the predetermined gaps T2$a$ and T2$b$ are configured to be provided before and after the timing "Ud Tx" in which the data signal is transmitted.

The one or multiple predetermined gaps may be "0" like T1$a$ and T2$b$ in FIG. 5.

Because the allocation notification of the Ud interface is received using the PDCCH through the Uu interface, it is necessary to determine a timing relationship between the Uu interface and the Ud interface, for example, T1$c$ and T2$c$ that indicate a timing difference between the "Uu DL" and the "Ud Tx".

The frequency used in the Ud interface may be used in the Ud interface between other mobile stations UE.

Accordingly, it is necessary to properly adjust T1$c$ and T2$c$ in order to maintain the orthogonality between the signals transmitted through the Ud interface.

In the case that the different frequencies are used in the transmission from the mobile station UE#1 to the mobile station UE#2 and the transmission from the mobile station UE#2 to the mobile station UE#1, although the necessity of the switching time is eliminated, it is necessary to properly adjust T1$c$ and T2$c$ in order to maintain the orthogonality between the signals transmitted through the Ud interface.

In the embodiment, the transmission/reception through the Uu interface or the transmission/reception through the Ud interface is switched in each subframe by way of example. However, the present invention can also be applied to a time-division pattern in which the "Ud Tx", the "Ud Rx", the "Uu UL", or the "Uu DL" is continued across the multiple subframes. The time-division pattern may dynamically be changed.

According to the mobile communication system of the embodiment of the present invention, as described above, in the subframe in which the data signal is transmitted through the Ud interface, the predetermined gaps are provided before and after the timing "Ud Tx" in which the data signal is transmitted, which allows the interference to be reduced in the direct communication between the mobile station UE#1 and the mobile station UE#2.

The features of the embodiment may be expressed as follows.

A first feature of the present invention is that the mobile communication system in which the Uu interface (the radio base station interface) between the mobile station UE#1 (the first mobile station) and the mobile station UE#2 (the second mobile station) and the radio base station eNB and the Ud interface (the inter-mobile station interface) between the mobile station UE#1 and the mobile station UE#2 are specified. In the mobile communication system, the radio base station eNB is configured to transmit the data signal to the mobile station UE#1 and the mobile station UE#2 through the Uu interface at the frequency F1 (the first frequency), the mobile station UE#1 and the mobile station UE#2 are configured to transmit the data signal to the radio base station eNB through the Uu interface at the frequency F2 (the second frequency), the mobile station UE#1 and the mobile station UE#2 are configured to transmit and receive the data signal to and from each other in the time-division manner through the Ud interface at the frequency F2 (the second frequency), and the predetermined gaps are configured to be provided before and after the timing in which the mobile station UE#1 and the mobile station UE#2 transmit the data signal through the Ud interface.

A second feature of the present invention is that the mobile communication system in which the Uu between the mobile station UE#1 and the mobile station UE#2 and the radio base station eNB and the Ud interface between the mobile station UE#1 and the mobile station UE#2 are specified. In the mobile communication system, the radio base station eNB is configured to transmit the data signal to the mobile station UE#1 and the mobile station UE#2 through the Uu interface at the frequency F1, the mobile station UE#1 and the mobile station UE#2 are configured to transmit and receive the data signal to and from each other in the time-division manner through the Ud interface at the frequency F1, the mobile station UE#1 and the mobile station UE#2 are configured to transmit the data signal to the radio base station eNB through the Uu interface at the frequency F2, and the predetermined gaps are configured to be provided before and after the timing in which the mobile station UE#1 and the mobile station UE#2 transmit the data signal through the Ud interface.

A third feature of the present invention is that the mobile communication system in which the Uu interface between the mobile station UE#1 and the mobile station UE#2 and the radio base station eNB and the Ud interface between the mobile station UE#1 and the mobile station UE#2 are specified. In the mobile communication system, the radio base station eNB is configured to transmit the data signal to the mobile station UE#1 and the mobile station UE#2 through the Uu interface at the frequency F1, the frequency F2 is configured to transmit the data signal to the radio base station eNB from the mobile station UE#1 and the mobile station UE#2 through the Uu interface at the frequency F2, the mobile station UE#1 and the mobile station UE#2 are configured to transmit and receive the data signal to and from each other in the time-division manner through the Ud interface at the frequency F3 (the third interface), and the predetermined gaps are configured to be provided before and after the timing in which the mobile station UE#1 and the mobile station UE#2 transmit the data signal through the Ud interface.

In the first to third features of the present invention, the duration of the predetermined gap or the duration of the subframe except the predetermined gap may be specified in units of symbols.

In the first to third features of the present invention, the radio base station eNB may notify the mobile station UE#1 and the mobile station UE#2 of the duration of the predetermined gap.

The operations of the radio base station eNB and the mobile stations UE#1 and UE#2 may be performed by hardware, a software module executed by a processor, or a combination thereof.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to the processor such that the processor can read and write the information in and from the storage medium. The storage medium may be integrated in the processor. The storage medium may be provided in an ASIC. The ASIC may be provided in the radio base station eNB or the mobile stations UE#1 and UE#2. The storage medium and the processor may be provided as a discrete component in the radio base station eNB or the mobile stations UE#1 and UE#2.

While the present invention has been described in details using the embodiments, it is apparent for a person skilled in the art that the present invention is not limited to the embodiments described in the present specification. The present invention can be implemented as a modification or an alternation without departing from the gist and scope of the present invention defined by the description of claims. Therefore, the description of the present specification intends illustration, and does not provide any restrictive meaning to the present invention.

This application is based on Japanese Patent Application No. 2011-112653 filed with the Japan Patent Office on May 19, 2011, the entire content of which is hereby incorporated by reference.

INDUSTRIAL APPLICABILITY

As described above, the present invention can provide the mobile communication system that can maintain the orthogonality between the signals in the direct communication between the mobile station UE#1 and the mobile station UE#2.

REFERENCE SIGNS LIST

UE#1, UE#2 Mobile station
eNB Radio base station
11 Scheduling unit
12 Transmission unit
13 Reception unit

The invention claimed is:

1. A mobile communication system comprising:
a first mobile station;
a second mobile station;
a radio base station;
a first radio base station interface between the first mobile station and the radio base station;
a second radio base station interface between the second mobile station and the radio base station; and
an inter-mobile station interface between the first mobile station and the second mobile station,
wherein the radio base station transmits a data signal to the first mobile station and the second mobile station through the first and second radio base station interfaces at a first frequency,
the first mobile station and the second mobile station transmit the data signal to the radio base station through the first and second radio base station interfaces at a second frequency,
the first mobile station and the second mobile station transmit and receive the data signal to and from each other through the inter-mobile station interface at the second frequency,
the transmission of the data signal through the first and second radio base station interfaces at the second frequency and the transmission and reception of the data signal through the inter-mobile station interface at the second frequency are performed in a time-division manner, and
predetermined gaps are provided before and after timing in which the first mobile station and the second mobile station transmit the data signal through the inter-mobile station interface, in consideration of a time required to switch between the transmission of the data signal through one of the first and second radio base station interfaces and the inter-mobile station interface and the reception of the data signal through the inter-mobile station interface in the second frequency.

2. The mobile communication system according to claim 1, wherein duration of the predetermined gap or duration of a subframe except the predetermined gap is specified in units of symbols.

3. The mobile communication system according to claim 1, wherein the radio base station notifies the first mobile station and the second mobile station of duration of the predetermined gap.

4. A mobile communication system comprising:
a first mobile station;
a second mobile station;
a radio base station;
a first radio base station interface between the first mobile station and the radio base station;
a second radio base station interface between the second mobile station and the radio base station; and
an inter-mobile station interface between the first mobile station and the second mobile station,
wherein the radio base station transmits a data signal to the first mobile station and the second mobile station through the first and second radio base station interfaces at a first frequency,
the first mobile station and the second mobile station transmit and receive the data signal to and from each other through the inter-mobile station interface at the first frequency,
the first mobile station and the second mobile station transmit the data signal to the radio base station through the first and second radio base station interfaces at a second frequency,
the transmission of the data signal through the first and second radio base station interfaces at the first frequency and the transmission and reception of the data signal through the inter-mobile station interface at the first frequency are performed in a time-division manner, and
predetermined gaps are provided before and after timing in which the first mobile station and the second mobile station transmit the data signal through the inter-mobile station interface, in consideration of a time required to switch between the reception of the data signal through one of the first and second radio base station interfaces and the inter-mobile station interface and the transmission of the data signal through the inter-mobile station interface in the first frequency.

5. The mobile communication system according to claim 4, wherein duration of the predetermined gap or duration of a subframe except the predetermined gap is specified in units of symbols.

6. The mobile communication system according to claim 4, wherein the radio base station notifies the first mobile station and the second mobile station of duration of the predetermined gap.

7. A mobile communication system comprising:
a first mobile station;
a second mobile station;
a radio base station;
a first radio base station interface between the first mobile station and the radio base station;
a second radio base station interface between the second mobile station and the radio base station; and
an inter-mobile station interface between the first mobile station and the second mobile station, wherein the radio base station transmits a data signal to the first mobile station and the second mobile station through the first and second radio base station interfaces at a first frequency, the first mobile station and the second mobile station transmit the data signal to the radio base station through the first and second radio base station interfaces at a second frequency, the first mobile station and the second mobile station transmit and receive the data signal to and from each other in a time-division manner through the inter-mobile station interface at a third frequency, and predetermined gaps are provided before and after timing in which the first mobile station and the second mobile station transmit the data signal through the inter-mobile station interface, in consideration of a time required to switch between transmission of the data signal through the inter-mobile station interface and reception of the data signal through the inter-mobile station interface in the third frequency.

8. The mobile communication system according to claim 7, wherein duration of the predetermined gap or duration of a subframe except the predetermined gap is specified in units of symbols.

9. The mobile communication system according to claim 7, wherein the radio base station notifies the first mobile station and the second mobile station of duration of the predetermined gap.

* * * * *